FREQUENCY DIVIDER SYSTEM

Filed Jan. 14, 1966 Sheet 1 of 2

INVENTOR
ROBERT E. BAUM
BY
Fidler, Bradley, & Patnaude
Attys.

INVENTOR
ROBERT E. BAUM
BY
Fidler, Bradley & Patnaude
Attys.

United States Patent Office 3,430,067

Patented Feb. 25, 1969

3,430,067

FREQUENCY DIVIDER SYSTEM

Robert E. Baum, Wheaton, Ill., assignor to Sencore, Inc., Addison, Ill., a corporation of Delaware Filed Jan. 14, 1966, Ser. No. 520,561
U.S. Cl. 307—225 10 Claims
Int. Cl. H03k 21/00, 23/22, 23/30

ABSTRACT OF THE DISCLOSURE

An apparatus for driving in synchronism the horizontal and vertical sweep circuits of a television receiver. The apparatus includes a generator for generating a 15,750 cycles per second signal and a frequency divider arrangement for dividing the signal by 262½ to generate a 60 cycles per second signal. To divide by 262½, the arrangement includes a frequency divider that divides by 17 and then by 18 in response to a bi-stable multivibrator. A monostable multivibrator and a differentiator respond to the output of the frequency divider to provide a pulse train having a series of equally-spaced pulses which have a frequency of 15,750 divided by 17½. This pulse train is then divided by 15 to produce the desired 60 cycles per second signal.

This invention relates to a frequency divider circuit that responds to a train of input pulses at one frequency by producing a train of pulses at a lower frequency such that the ratio of the higher frequency to the lower frequency is a non-integer.

As is well known, the line frequency of a television receiver is 15,750 cycles per second, and the field frequency is 60 cycles per second, so that the ratio of line to field frequency is 262.5, a non-integer. Because conventional frequency dividers divide by integer factors, conventional television test equipment generates sync signals at the line and field frequencies for a television receiver under test by applying the output of a crystal controlled oscillator to two separate channels, each of which divides the frequency of the oscillator signal by a different integer value. For example, the output of a 31.5 kc. oscillator could be applied to a first channel that divides the 31.5 kc. signal by the integer two in a single stage to produce the required line frequency sync signal, and to a second channel that divides the 31.5 kc. signal by the integer 525 in several stages to produce the required field frequency signal.

In the interests of simplification and in order to reduce the size of a portable test device for television receivers, as well as to reduce the number of component parts and power supply requirements, it would be highly desirable to produce a 60 cycles per second signal directly from the 15,750 cycles per second signal. As indicated previously, this requires a frequency divider circuit capable of dividing by a non-integer factor, and one of the objects of the present invention is to provide a relatively simple circuit that will achieve such a division.

The alignment of television receivers, particularly those designed to receive color transmissions, is materially facilitated if the raster generated on the receiver screen is perfectly interlaced (e.g., the spatial traces defining alternate fields on the screen do not overlap). To accomplish perfect interlace, the test equipment must be capable of effecting manually controllable shifts in the traces of alternate vertical fields relative to the traces of the other vertical fields. This requires that alternate ones of the 60 cycle field sync pulses generated by the test equipment, must be adjustable in point of time relative to the other sync pulses. Providing relatively simple circuitry that operates to achieve this end in conjunction with the frequency divider circuit referred to above, constitutes another object of this invention.

A still further object of the present invention is to provide an improved frequency divider circuit capable of counting a different integral number of pulses in succeeding cycles of operation.

A feature of the invention by which the objects thereof are achieved is the provision of a collector-base coupled transistor blocking oscillator, to the emitter of which is coupled an R–C timing network, and to the base of which is connected a source of periodic timing pulses that are to be counted. The timing pulses are of a polarity tending to forward bias the emitter-base junction, and when the peak value of a timing pulse exceeds the voltage on the capacitor of the timing network, the transistor is triggered and rapidly driven into saturation by the regenerative feedback coupling between the collector and the base. The triggering of the transistor causes a large voltage to appear on the capacitor reverse biasing the emitter-base junction and turning off the transistor. The latter remains off as the voltage on the capacitor decays to a level below the peak value of the timing pulses, whereupon the next timing pulse triggers the transistor and the cycle is repeated. Thus, the transistor is triggered each time an integer number of timing pulses occur, the magnitude of the number depending upon the time constant of the timing network.

Another feature of the invention is a toggle flip-flop that is switched each time the transistor is triggered and serves to switch the time constant of the timing network from one value to another whereby the number of timing pulses that occur from one triggering of the transistor to the next alternates between two integers. Since the toggle flip-flop will produce what is termed a primary output pulse every other time it is triggered, it follows that the number of timing pulses that occur between successive primary output pulses of the flip-flop will be the sum of the two integers. This sum will be odd if one integer is odd and one is even; and hence, to divide the timing pulses by a non-integer, what is required is to produce a pulse midway in point of time between successive primary output pulses of the flip-flop. This is achieved by causing the flip-flop to produce a primary output pulse upon counting to the larger of the two integers, and by providing a one-shot multivibrator triggered by the triggering of the transistor that occurs upon counting to the smaller of the two integers. Triggering of the one-shot multivibrator produces a pulse whose trailing edge can be adjusted to occur midway in point of time between successive output pulses of the flip-flop. The trailing edges of the last mentioned pulses are used to generate secondary pulses that occur at the same frequency as the primary pulses, but shifted in point of time by half a period. When the primary and secondary pulses are combined, the resultant output signal is at a frequency which is a non-integer multiple of the frequency of the timing pulses. Furthermore, the adjustability of the occurrence of the trailing edges of the pulses produced by the one-shot multivibrator permits alternate pulses in the resultant output signal to be shifted in time relative to the remaining pulses, the criterion required to be satisfied for shifting one field of a television frame relative to another in order to perfectly interlace the raster of a television receiver.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 1:
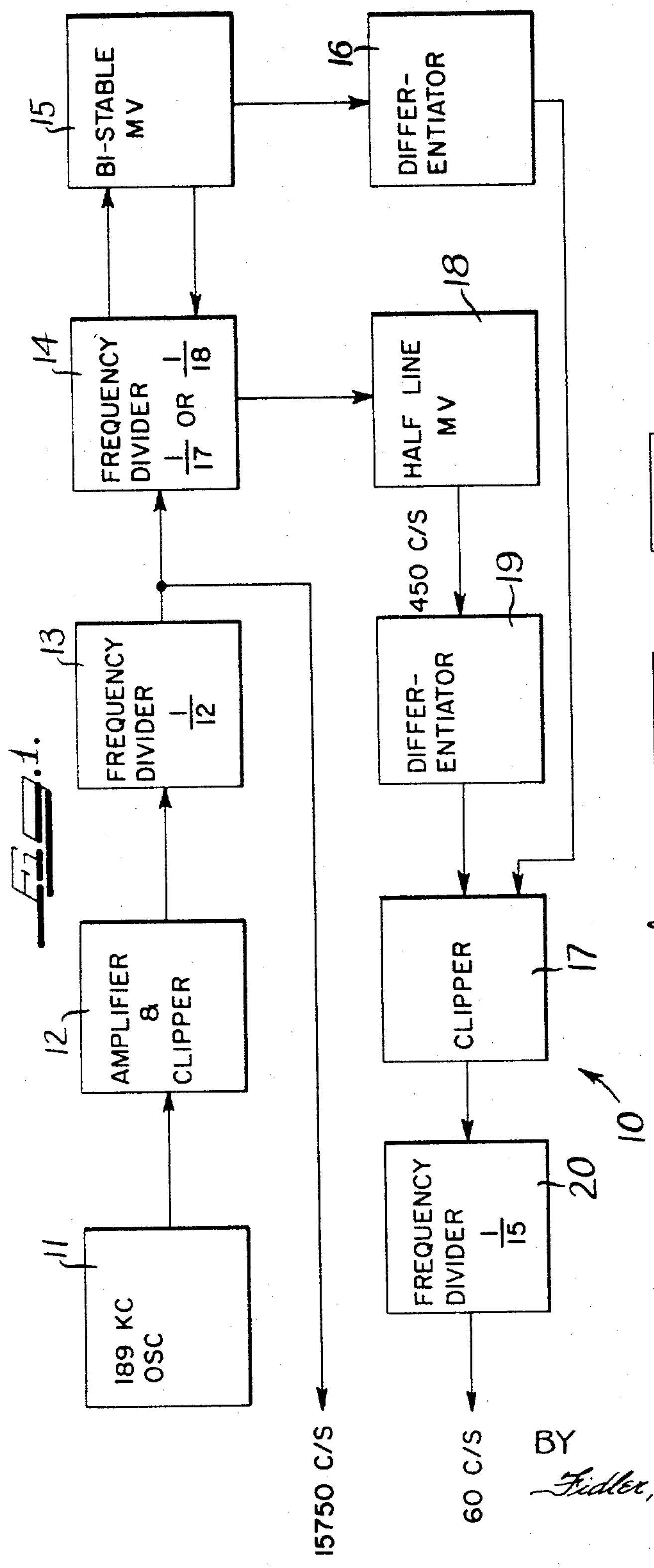
FIGURE 1 is a block diagram showing the invention incorporated into a piece of television test equipment concerned with generating the line and field frequency sync signals.

Referring now to FIGURE 1, reference numeral 10 designates a portion of a piece of television test equipment that is concerned with generating the line frequency sync signal at 15,750 cycles per second, and the field frequency sync signal at 60 cycles per second from a single frequency source. Portion 10 includes a crystal control oscillator 11 providing, to amplifier and clipper 12, a 189 kc. signal that forms the primary source from which both the line and field sync signals are developed. Amplifier and clipper 12 shapes the 189 kc. signal to produce a train of pulses, each of which has a relatively steep leading edge and drives frequency divider 13 which is described in detail below. Frequency divider 13 produces an output pulse each time twelve input pulses are applied thereto such that the output of divider 13 is a train of timing pulses occurring at the line frequency, namely 15,750 cycles per second. Thus, frequency divider 13 constitutes a source of timing pulses which the remainder of the circuit of portion 10 operates upon to produce the field frequency sync signal at 60 cycles per second.

The timing pulses from divider 13 are applied to frequency divider 14 constructed such that a different number of timing pulses occur between successive output pulses of frequency divider 14. Specifically, divider 14 divides successively by 17, then 18, then 17, etc. As will be described below, the selection of the number of pulses that occur between successive output pulses from frequency divider 14 depends upon the time constant of the timing network associated with the frequency divider. The output pulses from frequency divider 14 are used to trigger bi-stable multivibrator 15 constructed as a toggle flip-flop whose state establishes the time constant of the timing network. The parameters of flip-flop 15 are selected such that the two time constants established by the two states of the flip-flop, cause the number of timing pulses applied to divider 14, and that occur between successive triggerings thereof, to alternate between the values seventeen and eighteen.

As will be described below, the change of state of flip-flop 15 that occurs each time frequency divider 14 produces an output pulse, is applied to differentiator circuit 16 and then applied to clipper circuit 17. The latter includes a diode which passes only unidirectional negative pulses produced by differentiator circuit 16. The elements are so arranged that the diode of clipper 17 produces what is termed a primary pulse each time the state of flip-flop 15 changes due to the output pulse of frequency divider 14 that occurs when the latter counts eighteen timing pulses. Thus, the output of clipper 17 due to flip-flop 15 is a train of pulses that occur at the rate of $\frac{1}{35}$ of the rate at which timing pulses are applied to frequency divider 14. That is to say, the output of clipper 17 is a train of pulses at 450 cycles per second occurring in time coincident with the output of frequency divider 14 that occurs at the end of eighteen input timing pulses.

The output of frequency divider 14 is also applied to a half-line multivibrator 18 constructed as a one shot multivibrator and arranged to be triggered each time the frequency divider 14 produces an output pulse upon counting seventeen input timing pulses. The duration of the pulse produced by one shot multivibrator 18 is adjustable, permitting the trailing edge of such pulse to occur midway between the primary pulses produced by clipper 17. In other words, the trailing edge occurs after flip-flop 15 has changed state due to the seventeenth input timing pulse applied to frequency divider 14 but before the next input timing pulse occurs. The pulsed output from multivibrator 18 is applied to differentiator circuit 19 and then to clipper circuit 17. The output of clipper circuit 17 due to the multivibrator 18 is a train of unidirectional pulses termed the secondary output signal. The polarity of the pulses of the secondary output signals is the same as the polarity of the pulses of the primary output signals. Moreover, the frequency of the secondary output signal is the same as the frenqency of the primary output signal, namely 450 cycles per second. However, the pulses of the secondary signal occur in point of time coincident with the trailing edge of the output of the pulse from the one shot multivibrator 18 and thus fall midway in point of time between the pulses that constitute the primary output signal. As a result, the output signal from clipper 17 is a train of unidirectional pulses occurring at the rate of 900 cycles per second. This output signal is applied to frequency divider 20, which may be similar to frequency divider 13 and which operates in essentially the same manner except that division by fifteen is accomplished, producing a sync signal at the field frequency of 60 cycles per second.

Figure 3:
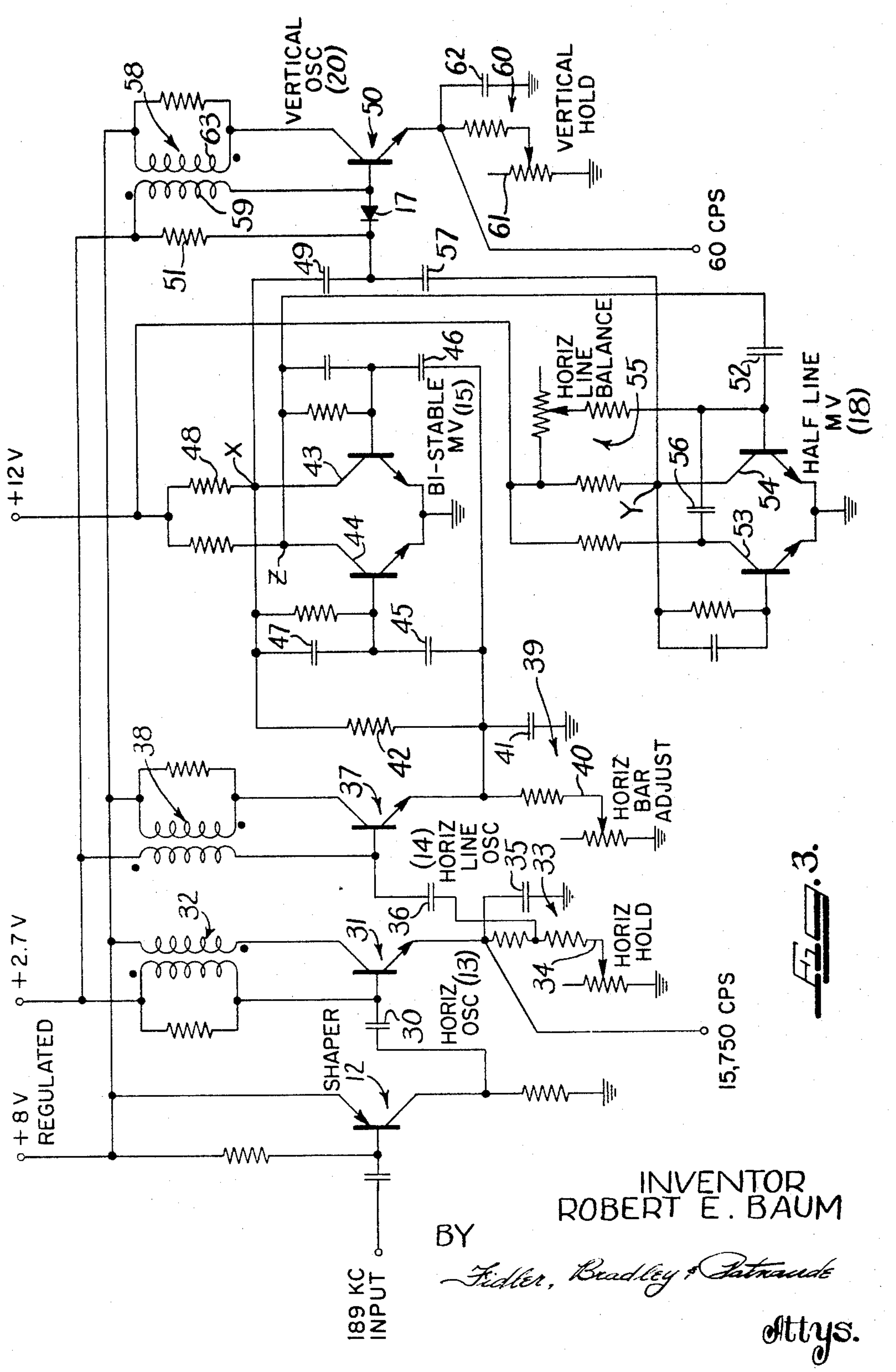
FIGURE 3 is a circuit diagram showing details of the blocks shown in FIGURE 1.

Details of frequency divider 14, toggle flip-flop 15, one shot multivibrator 18, differentiators 16 and 19, and clipper circuit 17 are shown in FIGURE 3 to which reference is now made. As indicated previously, the output of shaper 12 is a train of pulses at a frequency of 189 kc., each pulse having a steep leading edge. These pulses are coupled through coupling capacitor 30 to the base of transistor 31 which constitutes the active element of frequency divider 13 and forms what is termed the horizontal oscillator for the test equipment. The collector of transistor 31 is transformer coupled to the base of the transistor through pulse transformer 32 wound such that regenerative feedback is achieved. The emitter of transistor 31 is coupled to timing network 33 which comprises an adjustable resistance 34, and capacitor 35 connected directly to the emitter of the transistor. As will be seen from the explanation below, transistor 31 is essentially a collector-base coupled blocking oscillator that serves to produce an output pulse each time an integral number of timing pulses are applied to the base of the transistor through coupling capacitor 30. The positive timing pulses are of a polarity tending to forward-bias the emitter base junction of transistor 31, and when the peak value of a timing pulse exceeds the voltage on capacitor 35, the emitter base junction will be forward-biased. As transistor 31 begins to conduct, collector current flows through the primary of pulse transformer 32 inducing in the secondary of the pulse transformer, a voltage that supplies current to the base of transistor 31 driving the latter rapidly into saturation as a result of the regenerative feedback between the collector and base. As a consequence of this action, a large positive voltage appears across capacitor 35 at the emitter of transistor 31. This large positive voltage reverse-biases the emitter base junction of the transistor, driving it from saturation back to cut-off. The transistor remains cut-off until the voltage across capacitor 35 decays through resistance network 34 to a level below the peak value of the timing pulses. When the next timing pulse occurs, the transistor is triggered, and the cycle above described is repeated. Thus, the transistor is triggered each time an integral number of timing pulses occur, the value of the number depending upon the time constant of timing network 33. In the present illustration, the time constant is selected such that twelve input timing pulses occur between successive triggerings of the transistor 31. Thus, the voltage at the emitter of transistor 31 is a train of pulses at $\frac{1}{12}$ the frequency of the pulses appearing at the base of this transistor. Since pulses at the rate of 189 kc. are applied to the base of transistor 31, the voltage at the emitter of this transistor constitutes a signal at 15,750 cycles per second. For the purpose of this description, frequency divider 13 constitutes a source of periodic timing pulses coupled by capacitor 36 to the base of transistor 37 which is a part of frequency divider 14. The latter forms what is termed the horizontal line oscillator of the test equipment.

The collector of transistor 37 is coupled to the base through pulse transformer 38 much the same as the corresponding parts of transistor 31 are coupled. Similarly, the emitter of transistor 37 is connected to a timing network 39, in this case comprising an adjustable resistance 40, capacitor 41 connected directly to the emitter, a resistor 42 connected between the emitter of transistor 37 and the output of one side of toggle flip-flop 15 at point X. In the absence of timing pulses applied to the base of transistor 37, the right side of flip-flop 15, namely transistor 43 will conduct, and the left side of the flip-flop, namely transistor 44, will not conduct. This occurs because transistor 43 will be properly biased for conduction and the cross coupling between transistors 43 and 44 will cause the emitter-base junction of transistor 44 to be reverse-biased. In such case, point X is essentially at ground potential since transistor 43 is in saturation, with the result that the emitter of transistor 37 will be ground through adjustable resistor 40 and resistor 42. This combination of resistance in parallel with capacitor 41 establishes a time constant having a value such that the emitter-base junction of transistor 37 remains reverse-biased until after sixteen input pulses are applied to the base of transistor 37. The seventeenth pulse applied to the base of transistor 37, however, forward-biases the emitter base junction causing the flow of collector current in transistor 37 to be fed back in a positive sense through pulse transformer 38 to the base of this transistor rapidly driving it into saturation in a manner similar to that described in connection with transistor 31. As a result, the voltage at the emitter of transistor 37 increases rapidly, cutting off the transistor and applying a positive going pulse through coupling capacitors 45 and 46 to the base of each of transistors 43 and 44. As transistor 44 begins to conduct, aided by speed-up capacitor 47, conduction rapidly switches from transistor 43 to transistor 44 in a known manner. The voltage at point X is thus raised from ground potential to approximately twelve volts, the collector supply voltage for flip-flop 15. In this state of flip-flop 15, the emitter of transistor 37 is connected to ground through adjustable resistance 40 and the resistance comprising resistor 42 in series with collector resistor 48 of transistor 43. Thus, the time constant of the timing network 39 is now larger than it was when transistor 43 was conducting and transistor 44 was cut off. Since the time constant is larger, the decay of the voltage at the emitter transistor 37 will be less rapid with the result that a larger number of pulses must appear at the base of transistor 37 before the emitter base junction thereof is forwardly biased by one of the input pulses. In the present case, the parameters are chosen so that the eighteenth pulse appearing at the base of transistor 37 will forward-bias the emitter base junction when the state of flip-flop 15 is such that transistor 44 is conducting and transistor 43 is cut off. As described previously, when flip-flop 15 is in the state in which transistor 43 conducts and transistor 44 is cut off, seventeen input pulses must be applied to the base of transistor 37 before the emitter-base junction of this transistor is forward-biased.

Figure 2:
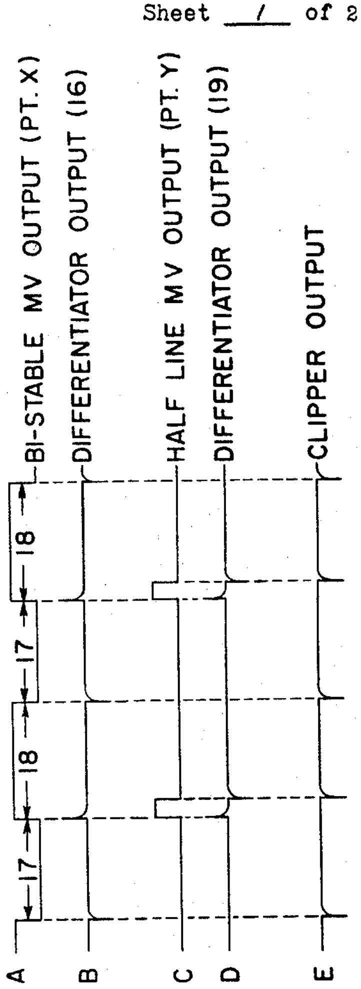
FIGURE 2 is a voltage-time diagram showing the waveform of the voltage variation at various points in the circuit diagram shown in FIGURE 3.

Point X is connected by capacitor 49 to the cathode of diode clipper 17 which is in the base circuit of transistor 50. The latter constitutes a part of frequency divider 20 which is also termed the vertical oscillator for the television test equipment. Capacitor 49 and resistor 51 constitute the differentiator 16 referred to previously. As a consequence of this arrangement, the voltage at the cathode of diode 17 has the form shown in line B of FIGURE 2 due to the voltage variation at point X shown in line A of this figure. The voltage at the anode of diode 17, due to the variation in voltage of point X from essentially ground potential to the twelve volt collector power supply, is a series of negative spikes occurring each time 35 input pulses are applied to the base of transistor 37. Such spikes occur at a frequency of $\frac{1}{35}$ of the frequency of the input timing pulses, namely at a rate of 450 cycles per second. Since the parameters of flip-flop 15 are selected to cause transistor 43 to turn on very rapidly, the trailing edges of the pulses produced at point X are quite steep resulting in a very rapid rise time associated with the pulses at the base of transistor 50. These pulses, it will be recalled, are termed primary output pulses since they are associated with the output of flip-flop 15.

Recalling that the output of frequency divider 14 is also coupled to one shot multivibrator 18, reference to FIGURE 3 indicates that such coupling is achieved by capacitor 52 which connects point Z in the collector of transistor 44 to the base of transistor 54. In the absence of any signal being coupled through capacitor 52, transistor 53 is biased to cut off by the conduction of transistor 54 which is provided with self-bias network 55. Point Y, which is the collector of transistor 54, is thus essentially at ground potential causing the emitter-base junction of transistor 53 to be reverse-biased.

One shot multivibrator 18 will be turned on, which is to say that conduction will switch from transistor 54 to transistor 53 for a period of time depending upon circuit parameters associated with the multivibrator, whenever a negative going trigger pulse is applied to the base of transistor 54. Such a trigger pulse will occur when the voltage at point Z drops from the twelve volt power supply voltage to ground potential as conduction switches from transistor 43 to transistor 44. This switch in conduction occurs, it will be recalled, when transistor 37 is triggered by the seventeenth input pulse applied to the base thereof. Thus, one shot multivibrator 18 is triggered on the seventeenth input timing pulse that triggers transistor 37. The triggering of multivibrator 18 causes the voltage at point Y to rise from ground potential to the power supply voltage for this multivibrator as transistor 54 switches from conduction to non-conduction and transistor 53 switches from non-conduction to conduction. Transistor 53 remains conductive for a period of time depending upon the circuit parameters, and at the end of such time, transistor 54 again conducts, driving transistor 53 to cut off. Point Y then returns to ground potential as transistor 54 returns to saturation. The voltage at point Y is shown in line C of FIGURE 2. The pulse width of the voltage at point Y is determined essentially by the resistance of self-bias network 55 and capacitor 56 which couples the base of transistor 54 to the collector of transistor 53. Adjustment of the bias resistance for transistor 54 permits the trailing edges of the pulses produced at point Y to be adjusted in time. It should be noted that when the voltage at point X changes from the power supply voltage to ground potential, which is to say that the voltage at point Z changes from ground to the power supply voltage, as transistor 43 of flip-flop 15 is turned on by the triggering of transistor 37 that occurs after eighteen input pulses are applied to the base thereof, a positive trigger pulse is applied to the base of transistor 54 of one shot multivibrator 18. Since transistor 54 is already conducting, this positive trigger pulse merely increases the forward voltage across the emitter-base junction of transistor 54 and does not serve to switch conduction between the two transistors.

As shown in FIGURE 3, point Y is connected to the cathode of diode 17 through coupling capacitor 57 which, together with resistor 51, forms differentiator 19. As a result, the voltage appearing at the cathode of diode 17 due to the votlage variation at point Y has the form shown in line D of FIGURE 2. The voltage at the anode of diode 17, due to the variation in voltage of point Y from essentially ground potential to the twelve volt collector power supply voltage, is a series of negative spikes occurring each time thirty-five input pulses are applied to the base of transistor 37. Such spikes occur at a frequency of 1/35 of the frequency of the input timing pulses, namely at the rate of 450 cycles per second. The voltage at the anode of diode 17 due to the voltage variation at points X and Y has the form shown in line E of FIGURE 2. That is to say, the voltage applied to the base of transistor 50 is a series of negative trigger pulses occurring at the rate of 900 cycles per second. Alternate ones of these trigger pulses are derived from the voltage variation at the point X, and the remainder of the trigger pulses are derived from the voltage variation at point Y. The negative trigger pulses derived from the variation voltage at the point Y can be adjusted in time relative to the negative trigger pulses derived from the voltage variation at point X because of the adjustable nature of the pulse width produced by one shot multivibrator 18. As a consequence of this adjustable pulse width, the negative trigger pulses derived from the voltage variation at point Y can be made to occur exactly midway in point of time between the pulses derived from the voltage variation at point X. In such case, a negative trigger pulse occurs at the base of transistor 50 after every seventeen and a half input timing pulses are applied to the base of transistor 37.

To generate the field frequency sync signal for the television test equipment, the 900 cycles per second output signal developed at the base of transistor 50 must be divided by 15. This division is achieved in frequency divider 20, also termed the vertical oscillator for the test equipment. The operation of this frequency divider is somewhat different from the operation of frequency dividers 13 and 14 previously described in that the timing input pulses for frequency divider 20 are negative trigger pulses. In the case of divider 20, pulse transformer 58 which couples the collector of transistor 50 to the base thereof is utilized to convert the negative trigger pulses appearing at the cathode of diode 17 to positive trigger pulses capable of triggering transistor 50. Each negative trigger pulse appearing at the base of transistor 50 and applied to winding 59 of pulse transformer 58 causes winding 59 to ring, producing immediately after the negative trigger pulse, a positive pulse which tends to forward-bias the emitter-base junction of transistor 50. The emitter of transistor 50 is connected to a timing network 60 comprising adjustable resistor 61 and capacitor 62. When the voltage on capacitor 62 has decayed to a level at which the next negative trigger pulse aplied to the base of transistor 50 causes winding 59 to ring and produce a positive pulse that forward-biases the emitter-base junction of transistor 50, the transistor will be triggered by the regenerative feedback connection between the collector and the base. The resistance shunting the winding 63 of pulse transformer 58 serves to dampen the ringing of the voltage at the base of transistor 50 in order to prevent spurious counting by transistor 50. The time constant of timing network 60 is selected such that the transistor is triggered immediately after the fifteenth negative trigger pulse has been produced by diode 17. Since the negative trigger pulses occur at the rate of 900 cycles per second, the voltage at the emitter of transistor 50 is a 60 cycle per second signal that may serve as the field frequency sync signal.

Recalling that divider 20 divides by an odd number, namely 15 it follows that the occurrence of alternate ones of the pulses produced at the emitter of transistor 50 will be determined by the variation in voltage at point X, and the occurrence of the remainder of the pulses produced will be associated with the variation in voltage at point Y. Consequently, it is possible to shift alternate ones of the pulses appearing at the emitter of transistor 50 relative to the remainder of the pulses by manually adjusting the resistance of self-bias network 55 associated with transistor 54 of one shot multivibrator 18. This means that one field of the raster on a television receiver can be perfectly interlaced with the other field of the raster merely by visually inspecting the screen of the television receiver, and manually adjusting the self-bias network associated with transistor 54.

While the present disclosure involves generating the field frequency at 60 cycles per second from the line frequency of 15,750 cycles per second utilizing a frequency divider that divideds alternately by 17 and 18, and another frequency divider that divides by 15, it is believed obvious that many other combinations of numbers to divide by could be utilized. Furthermore, the original source of signals could be at a frequency other than 189 kc.

It will be recalled that alternate ones of the negative trigger pulses appearing at the base of transistor 50 coincide in point of time with a transition of the voltage at point X that occurs when transistor 37 is triggered by the eighteenth timing input pulse applied to its base. The remaining ones of the negative trigger pulses appearing at the base of transistor 50 coincide in point of time with a transition of the voltage at point Y that occurs when transistor 37 is triggered by the seventeenth input pulse applied to its base. This arrangement require that the width of the pulses produced by the one-shot multivibrator be approximately one-half the period of the timing input pulses appearing at the base of transistor 37.

Representative component values of a device actually constructed are as follows:

| Element | Component | Value |
|---|---|---|
| 17 | Diode | 1N34A |
| 30 | Capacitor | 15 pf |
| 31, 37, 43, 44, 53, 54 | Transistor | 2N2923 |
| 50 | do | 40,234 |
| 34 | Fixed/fixed/variable resistor | 5.6K/2.7K/6K |
| 35 | Capacitor | 3,900 pf |
| 36 | do | 200 pf |
| 40 | Fixed/variable resistor | 8.2K/6K |
| 41 | Capacitor | 0.1 mf |
| 42 | Resistor | 330K |
| 45, 46, 47 | Capacitor | 1,000 pf |
| 48 | Resistor | 5.6 K |
| 49,57 | Capacitor | 33 pf |
| 51 | Resistor | 10 K |
| 52 | Capacitor | 390 pf |
| 55 | Fixed/variable resistor | 10K/5K |
| 56 | Capacitor | 3,000 pf |
| 61 | Fixed/variable resistor | 12K/10K |
| 62 | Capacitor | 1.0 mf |

Those skilled in the art will recognize that by placing the timing network in the emitter circuit associated with a transistor, that the network is less critical to the operation of the transistor as a blocking oscillator. Moreover, the transistor characteristics become less important, and the low output impedance coupled with the high impedance input of the emitter-follower configuration enhance the overall electrical characteristics. The good temperature response and low current drain characteristics of this circuit are also important improvements over the prior art.

What is claimed is:

1. A frequency divider system comprising:

(a) a collector-base coupled transistor blocking oscillator having a base and an emitter;

(b) a source of periodic timing pulses coupled to said base and of a polarity tending to forward bias the emitter-base juctions;

(c) a timing network connected to said emitter including a capacitor arranged so that a timing pulse that forward biases the emitter-base junction of the transistor triggers the latter and drives it into saturation causing a regenerative voltage to be developed on said capacitor and that reverse biases the emitter-base junction and turns off the transistor until the voltage on the capacitor decays to a level at which a timing pulse can again forward bias the emitter-base junction, whereby the transistor is triggered each time an integral number of timing pulses occur, said timing network including a two-state switch means whose state changes in response to triggering of the transistor for alternately switching the time constant of said timing network from one value to another such that the number of timing pulses that occur between successive triggerings of the transistor alternates between a first integer and a second integer;

(d) means responsive to a change in said switch means from one particular state to the other for producing a primary output pulse on every such change whereby the number of timing pulses that occur between successive primary output pulses is equal to the sum of said first and second integers; and (e) a pulse generator responsive to triggering of said transistor for producing a pulse each time the triggering of said transistor causes said switch means to change from said other state back to said one particular state, said pulse generator includes means responsive to the last-mentioned pulse for developing a secondary pulse substantially midway, in point of time, between successive primary pulses.

2. A frequency divider system according to claim 1 including adder means for combining said primary pulses and said secondary pulses to define an output signal, whereby the frequency of the pulses in said output signal is a non-integer multiple of the frequency of said timing pulses.

3. A frequency divider system comprising:

(a) a collector-base coupled transistor blocking oscillator having a base and an emitter;

(b) a source of periodic timing pulses coupled to said base and of a polarity tending to forward bias the emitter-base junction;

(c) a timing network connected to said emitter including a capacitor arranged so that a timing pulse that forward biases the emitter-base junction of the transistor triggers the latter and drives it into saturation causing a regenerative voltage to be developed on said capacitor and that reverse biases the emitter-base junction and turns off the transistor until the voltage on the capacitor decays to a level at which a timing pulse can again forward bias the emitter-base junction, whereby the transistor is triggered each time an integral number of timing pulses occur, said timing network including a two-state switch means whose state changes in response to triggering of the transistor for alternately switching the time constant of said timing network from one value to another such that the number of timing pulses that occur between successive triggerings of the transistor alternates between a first integer and a second integer;

(d) means responsive to a change in said switch means from one particular state to the other for producing a primary output pulse on every such change whereby the number of timing pulses that occur between successive primary output pulses is equal to the sum of said first and second integers; and (e) a pulse generator responsive to triggering of said transistor for producing a pulse each time the triggering of said transistor causes said switch means to change from said other state back to said one particular state, said pulse generator comprises a one-shot multivibrator that produces a pulse in response to a change in state of said switch means from said other state back to said one particular state, the occurrence of the trailing edge of said last-mentioned pulse being manually adjustable, and means responsive to the trailing edge of said last-mentioned pulse to develop a secondary output pulse that substantially coincides with said trailing edge.

4. Apparatus for driving in synchronism the horizontal and vertical sweep circuits of a television receiver, said apparatus comprising:

(a) a source for generating an input train of pulses at a rate of 15,750 cycles per second;

(b) frequency divider means responsive to said input train of pulses for producing a first train of pulses consisting of alternate ones of alternating first and second pulses, each of said second pulses being closer in time to its preceding first pulse than to its successive first pulse;

(c) means responsive to said frequency divider means for generating a series of third pulses, each of said third pulses occurring subsequent to its corresponding second pulses;

(d) means responsive to said first pulses and said third pulses to generate a second train of pulses consisting of alternate ones of alternating said first and said third pulses, each of said third pulses being equally-spaced in time from both its preceding and its succeeding first pulses; and (e) means responsive to said second train of pulses for generating an output train of pulses at a rate of 60 cycles per second in synchronism with said input train of pulses.

5. Apparatus according to claim 4, wherein said frequency divider means comprises a frequency divider having a timing means for timing at a first and a second timing rate, a bi-stable means responsive to said frequency divider for alternately switching said timing means between its first and its second timing rates, and a differentiating means responsive to said bi-stable means for generating said first train of pulses in response to said first and second timing rates of said timing means.

6. Apparatus according to claim 5, wherein said first timing rate causes said frequency divider to divide by 17 and said second timing rate causes said frequency divider to divide by 18.

7. Apparatus according to claim 4, wherein said means responsive to said output of said frequency divider means comprises a monostable means for generating delayed pulses, and differentiating means responsive to said delayed pulses for generating said third pulses.

8. Apparatus according to claim 4, wherein said means responsive to said first and third pulses comprises a clipper for passing only said first and third pulses.

9. Apparatus according to claim 4, wherein said means responsive to said second train of pulses comprises a frequency divider for dividing said second train of pulses by a given number to produce said output train of pulses of 60 cycles per second.

10. Apparatus according to claim 9, wherein said frequency divider divides said second train of pulses by 15.

References Cited

UNITED STATES PATENTS

| | | | |
|---|---|---|---|
| 3,040,185 | 6/1962 | Horton | 307—88.5 |
| 3,121,803 | 2/1964 | Watters | 307—88.5 |

ARTHUR GAUSS, *Primary Examiner.*

S. D. MILLER, *Assistant Examiner.*

U.S. Cl. X.R.

307—293; 331—51, 112; 328—39; 307—237, 269, 271, 275, 289